United States Patent
Zhang et al.

(10) Patent No.: US 11,948,073 B2
(45) Date of Patent: Apr. 2, 2024

(54) MACHINE LEARNING INFERENCE ENGINE SCALABILITY

(71) Applicants: Advanced Micro Devices, Inc., Santa Clara, CA (US); ATI Technologies ULC, Markham (CA)

(72) Inventors: Lei Zhang, Richmond Hill (CA); Sateesh Lagudu, Hyderabad (IN); Allen Rush, Danville, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 1005 days.

(21) Appl. No.: 16/117,302

(22) Filed: Aug. 30, 2018

(65) Prior Publication Data

US 2019/0325305 A1 Oct. 24, 2019

Related U.S. Application Data

(60) Provisional application No. 62/660,817, filed on Apr. 20, 2018.

(51) Int. Cl.
*G06N 3/08* (2023.01)
*G06N 3/04* (2023.01)

(52) U.S. Cl.
CPC ............ *G06N 3/08* (2013.01); *G06N 3/04* (2013.01)

(58) Field of Classification Search
CPC .. G06N 3/08; G06N 3/04; G06N 5/04; G06N 20/00; G06T 2210/08; G05B 13/00
See application file for complete search history.

(56) References Cited

U.S. PATENT DOCUMENTS 4,873,630 A   10/1989   Rusterholz et al.
5,657,420 A    8/1997   Jacobs et al.
(Continued)

FOREIGN PATENT DOCUMENTS

EP    3098762 A1    11/2016
JP  2014203135 A    10/2014
(Continued)

OTHER PUBLICATIONS

Yujun Lin, Song Han, Huizi Mao, Yu Wang, William J. Dally, Deep Gradient Compression: Reducing the Communication Bandwidth for Distributed Training, Dec. 5, 2017, pp. 1-13 (Year: 2017).*

(Continued)

*Primary Examiner* — Kamran Afshar
*Assistant Examiner* — Brian J Hales
(74) *Attorney, Agent, or Firm* — Kowert, Hood, Munyon, Rankin & Goetzel, P.C.; Rory D. Rankin (57) ABSTRACT

Systems, apparatuses, and methods for adaptively mapping a machine learning model to a multi-core inference accelerator engine are disclosed. A computing system includes a multi-core inference accelerator engine with multiple inference cores coupled to a memory subsystem. The system also includes a control unit which determines how to adaptively map a machine learning model to the multi-core inference accelerator engine. In one implementation, the control unit selects a mapping scheme which minimizes the memory bandwidth utilization of the multi-core inference accelerator engine. In one implementation, this mapping scheme involves having one inference core of the multi-core inference accelerator engine fetch given data and broadcast the given data to other inference cores of the inference accelerator engine. Each inference core fetches second data unique to the respective inference core. The inference cores (Continued)

then perform computations on the first and second data in order to implement the machine learning model.

20 Claims, 9 Drawing Sheets

(56) References Cited

U.S. PATENT DOCUMENTS

| | | | |
|---|---|---|---|
| 6,067,287 | A | 5/2000 | Chung-Ju et al. |
| 8,131,660 | B2 | 3/2012 | Davis et al. |
| 8,369,595 | B1 | 2/2013 | Derakhshani et al. |
| 9,319,137 | B2 | 4/2016 | Zhuge et al. |
| 9,430,735 | B1* | 8/2016 | Vali .................. G06N 3/04 |
| 10,078,794 | B2 | 9/2018 | Pierce et al. |
| 10,740,674 | B2* | 8/2020 | Ambrose ............ G06N 3/045 |
| 10,776,684 | B1* | 9/2020 | Agarwal .............. G06N 3/08 |
| 2002/0152441 | A1 | 10/2002 | Senda et al. |
| 2006/0031652 | A1 | 2/2006 | Richter et al. |
| 2007/0030926 | A1 | 2/2007 | Brown et al. |
| 2011/0296212 | A1* | 12/2011 | Elnozahy .......... G06F 9/5044 713/320 |
| 2015/0178246 | A1 | 6/2015 | Herrero Abellanas et al. |
| 2015/0242322 | A1* | 8/2015 | Vajapeyam ....... G06F 12/0842 711/119 |
| 2015/0358755 | A1 | 12/2015 | Luo et al. |
| 2016/0062294 | A1 | 3/2016 | Murashima |
| 2016/0179434 | A1 | 6/2016 | Herrero Abellanas et al. |
| 2016/0259994 | A1 | 9/2016 | Ravindran et al. |
| 2016/0350645 | A1 | 12/2016 | Brothers et al. |
| 2016/0379109 | A1 | 12/2016 | Chung et al. |
| 2017/0124451 | A1* | 5/2017 | Barham ............ G06N 3/0454 |
| 2017/0286864 | A1* | 10/2017 | Fiedel ................. G06F 9/546 |
| 2017/0316312 | A1 | 11/2017 | Goyal et al. |
| 2017/0344882 | A1* | 11/2017 | Ambrose ............. G06N 3/08 |
| 2018/0032859 | A1 | 2/2018 | Park et al. |
| 2018/0032867 | A1 | 2/2018 | Son et al. |
| 2018/0046900 | A1 | 2/2018 | Dally et al. |
| 2018/0082212 | A1 | 3/2018 | Faivishevsky et al. |
| 2018/0089087 | A1 | 3/2018 | Chang et al. |
| 2018/0096226 | A1 | 4/2018 | Aliabadi et al. |
| 2018/0174036 | A1 | 6/2018 | Han et al. |
| 2018/0189641 | A1 | 7/2018 | Boesch et al. |
| 2018/0218303 | A1 | 8/2018 | Cole et al. |
| 2018/0262291 | A1 | 9/2018 | Doster et al. |
| 2018/0307972 | A1* | 10/2018 | Feng .................. G06N 3/08 |
| 2018/0365558 | A1 | 12/2018 | Sekiyama et al. |
| 2019/0026237 | A1 | 1/2019 | Talpes et al. |
| 2019/0028752 | A1 | 1/2019 | Zhang et al. |
| 2019/0205745 | A1* | 7/2019 | Sridharan ........... G06F 9/5077 |
| 2019/0266015 | A1* | 8/2019 | Chandra ............ G06F 9/5027 |
| 2019/0324755 | A1 | 10/2019 | Herr et al. |
| 2019/0324759 | A1* | 10/2019 | Yang ................. G06N 3/084 |
| 2019/0325296 | A1 | 10/2019 | Fowers et al. |
| 2020/0258223 | A1 | 8/2020 | Yip et al. |

FOREIGN PATENT DOCUMENTS

| | | |
|---|---|---|
| JP | 2016033806 A | 3/2016 |
| JP | 2017151604 A | 8/2017 |
| WO | 2017003887 A1 | 1/2017 |

OTHER PUBLICATIONS

Huimin Li, Xitian Fan, Li Jiao, Wei Cao, Xuegong Zhou and Lingli Wang, "A high performance FPGA-based accelerator for large-scale convolutional neural networks," 2016 26th International Conference on Field Programmable Logic and Applications (FPL), 2016, pp. 1-9 (Year: 2016).*

Notice of Allowance in U.S. Appl. No. 16/234,956, dated May 5, 2020, 10 pages.

Non-Final Office Action in U.S. Appl. No. 15/657,613, dated Oct. 5, 2018, 12 pages.

Lagudu et al., U.S. Appl. No. 15/812,336, entitled "Memory Bandwidth Reduction Techniques for Low Power Convolutional Neural Network Inference Applications", filed Nov. 14, 2017, 41 pages.

Lagudu et al., U.S. Appl. No. 16/177,218, entitled "Low Latency Long Short-Term Memory Inference with Sequence Interleaving", filed Oct. 31, 2018, 28 pages.

Zhang et al., U.S. Appl. No. 16/234,956, entitled "Tiling Format for Convolutional Neural Networks", filed Dec. 28, 2018, 42 pages.

Non-Final Office Action in U.S. Appl. No. 15/812,336, dated Oct. 14, 2020, 20 pages.

Wang et al., U.S. Appl. No. 16/367,093, entitled "Auto Generation and Tuning Tool for Convolution Kernels", filed Mar. 27, 2019, 32 pages.

Final Office Action in U.S. Appl. No. 15/657,613, dated Mar. 8, 2019, 10 pages.

International Search Report and Written Opinion in International Application No. PCT/US2018/052358, dated Feb. 18, 2019, 13 pages.

Cecconi et al., "Optimal Tiling Strategy for Memory Bandwidth Reduction for CNNs", International Conference on Advanced Concepts for Intelligent Vision Systems, Sep. 18, 2017, pp. 89-100.

Fan et al., "F-C3D: FPGA-based 3-Dimensional Convolutional Neural Network", 27th International Conference on Field Programmable Logic and Applications (FPL), Sep. 4, 2017, 4 pages.

Rahman et al., "Efficient FPGA Acceleration of Convolutional Neural Networks Using Logical-3D Compute Array", Proceedings of the 2016 Conference on Design, Automation & Test in Europe, Mar. 14, 2016, pp. 1393-1398.

Non-Final Office Action in U.S. Appl. No. 17/006,533, dated Jan. 27, 2022, 12 pages.

First Examination Report in Indian Patent Application No. 202017020013, dated Mar. 28, 2022, 7 pages.

Non-Final Office Action in U.S. Appl. No. 16/367,093, dated May 19, 2022, 15 pages.

Non-Final Office Action in U.S. Appl. No. 16/177,218, dated May 23, 2022, 16 pages.

Notice of Allowance in U.S. Appl. No. 17/006,533, dated Jul. 5, 2022, 8 pages.

Non-Final Office Action in Japanese Patent Application No. 2020-544323, dated Aug. 23, 2022, 9 pages.

Final Office Action in U.S. Appl. No. 16/367,093, dated Dec. 16, 2022, 17 pages.

Non-Final Office Action in U.S. Appl. No. 18/050,939, dated Mar. 29, 2023, 13 pages.

* cited by examiner

MACHINE LEARNING INFERENCE ENGINE SCALABILITY

CROSS REFERENCE TO RELATED APPLICATIONS

This application claims priority to Provisional Patent Application Ser. No. 62/660,817, entitled "Machine Learning Inference Engine Scalability", filed Apr. 20, 2018, the entirety of which is incorporated herein by reference.

BACKGROUND

Description of the Related Art

An emerging technology field is machine learning, with a convolutional neural network being one type of a machine learning model. Convolutional neural networks have demonstrated excellent performance at tasks such as handwritten digit classification and face detection. Additionally, convolutional neural networks have also shown promise for performing well in other, more challenging, visual classification tasks. Other types of machine learning models are also used in a wide variety of applications. However, machine learning models often use significant amounts of processing resources and external memory bandwidth. Accordingly, techniques for improving performance and/or reducing memory bandwidth utilization of machine learning models are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that, for simplicity and clarity of illustration, elements shown in the figures have not necessarily been drawn to scale. For example, the dimensions of some of the elements may be exaggerated relative to other elements.

Various systems, apparatuses, and methods for adaptively mapping a machine learning model to a multi-core inference accelerator engine are disclosed herein. A computing system includes a multi-core inference accelerator engine coupled to a memory subsystem. The system also includes a control unit which determines how to adaptively map a machine learning model to the inference accelerator engine. In one implementation, the control unit selects a mapping scheme which minimizes the memory bandwidth utilization of the multi-core inference accelerator engine. In one implementation, this mapping scheme involves having one inference core of the multi-core inference accelerator engine fetch and broadcast first data to the other inference cores. Each inference core fetches second data unique to the inference core. The inference cores then perform computations on the first and second data in order to implement the machine learning model.

Figure 1:
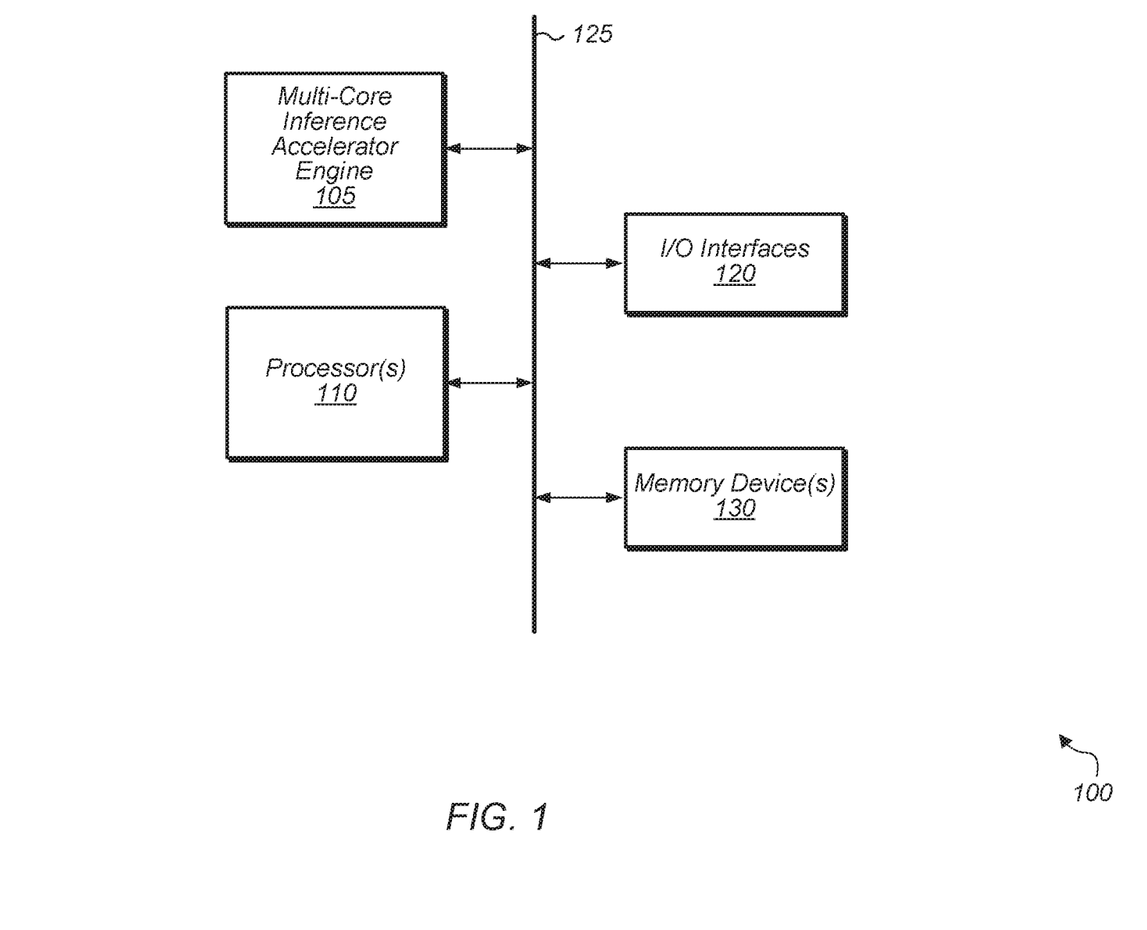
FIG. 1 is a block diagram of one implementation of a computing system.

Referring now to FIG. 1, a block diagram of one implementation of a computing system 100 is shown. In one implementation, computing system 100 includes at least multi-core inference accelerator engine 105, processor(s) 110, input/output (I/O) interfaces 120, bus 125, and memory device(s) 130. It is noted that multi-core inference accelerator engine 105 can also be referred to as multi-core inference engine 105, inference engine 105, accelerator 105, or accelerator unit 105. In other implementations, computing system 100 can include other components and/or computing system 100 can be arranged differently.

In various implementations, multi-core inference accelerator engine 105 includes logic for implementing any of various machine learning algorithms or machine learning models. In one implementation, multi-core inference accelerator engine 105 implements one or more layers of a convolutional neural network. For example, in this implementation, multi-core inference accelerator engine 105 implements one or more convolutional layers and/or one or more fully connected layers. In another implementation, multi-core inference accelerator engine 105 implements one or more layers of a recurrent neural network. Generally speaking, an "inference engine", "multi-core inference accelerator engine", or "inference accelerator engine" is defined as hardware and/or software which receives image data and generates one or more label probabilities for the image data. In some cases, an "inference engine" or "inference accelerator engine" is referred to as a "classification engine" or a "classifier". In one implementation, the logic of multi-core inference accelerator engine 105 includes a plurality of multiplier-accumulator (MAC) units, peripherals, and internal memory storage. In one implementation, the peripherals include a memory interface, a direct memory access (DMA) engine, and a microprocessor.

In one implementation, multi-core inference accelerator engine 105 is a trained neural network. For example, in this implementation, multi-core inference accelerator engine 105 analyzes a video frame to generate one or more label probabilities for the video frame. For example, potential use cases include at least eye tracking, object recognition, point cloud estimation, ray tracing, light field modeling, depth tracking, and others. For eye tracking use cases, probabilities generated by multi-core inference accelerator engine 105 are based on learned patterns, dwell, transition angles, blink, etc. In other implementations, multi-core inference accelerator engine 105 is customized for other types of use cases.

Processors(s) 110 are representative of any number and type of processing units (e.g., central processing unit (CPU), graphics processing unit (GPU), digital signal processor (DSP), field programmable gate array (FPGA), application specific integrated circuit (ASIC)). In one implementation, some of the processing associated with multi-core inference accelerator engine 105 is performed by processor(s) 110. Memory device(s) 130 are representative of any number and type of memory devices. For example, the type of memory in memory device(s) 130 can include Dynamic Random Access Memory (DRAM), Static Random Access Memory (SRAM), NAND Flash memory, NOR flash memory, Ferroelectric Random Access Memory (FeRAM), or others. Memory device(s) 130 are accessible by multi-core inference accelerator engine 105 and processor(s) 110. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
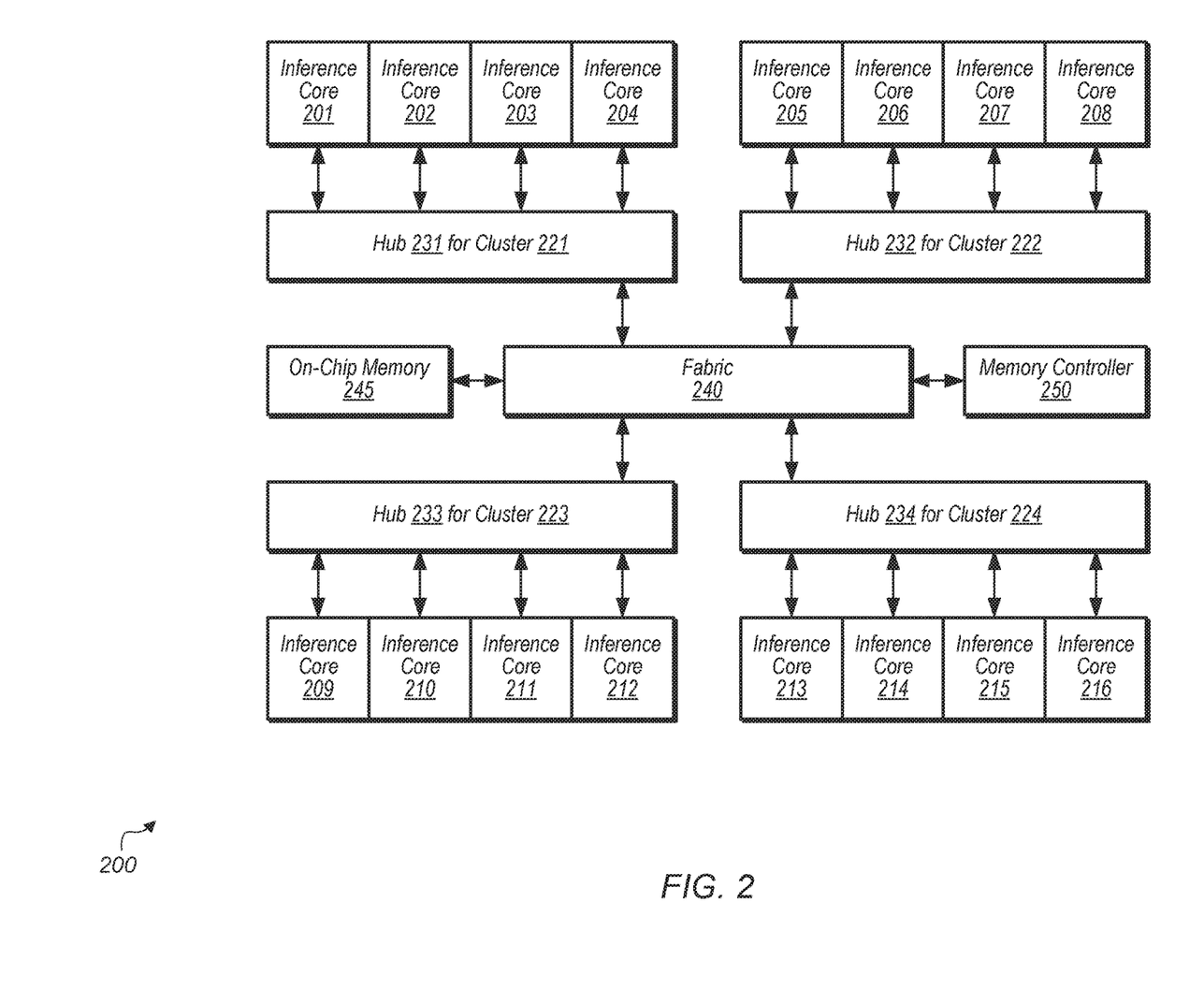
FIG. 2 is a block diagram of one implementation of a multi-core inference accelerator engine.

Turning now to FIG. 2, a block diagram of one implementation of a multi-core inference accelerator engine 200 is shown. In one implementation, multi-core inference accelerator engine 200 includes 16 separate inference cores 201-216. In other implementations, multi-core inference accelerator engine 200 includes other numbers of separate inference cores. In one implementation, each set of four inference cores constitutes a separate cluster. Accordingly, cluster 221 includes inference cores 201-204, cluster 222 includes inference cores 205-208, cluster 223 includes inference cores 209-212, and cluster 224 includes inference cores 213-216. In one implementation, a "cluster" is defined a collection of inference cores. Clusters 221-224 are coupled to hubs 231-234. Each of hubs 231-234 includes a hierarchy of memory and interconnection logic for connecting together the inference cores of the corresponding clusters 221-224, respectively. The architecture of hubs 231-234 provides a way to efficiently manage the local movement and storage of data that is required for each of the inference cores 201-216 for clusters 221-224, respectively.

Hubs 231-234 are also coupled to fabric 240, with fabric 240 including any type of interconnection fabric, buses, or other connection circuitry. Fabric 240 is also coupled to on-chip memory 245 which includes any amount and type of memory for storing on-chip data. Fabric 240 is also coupled to memory controller 250 which is coupled to any number and type of memory devices. In other implementations, multi-core inference accelerator engine 200 includes other numbers and/or types of components arranged in other suitable manners.

In one implementation, an "inference core" is defined as a collection of computing elements that are supervised as a unit and execute a collection of instructions to support various machine learning models. In one implementation, a "multi-core inference accelerator engine" is defined as a combination of multiple inference cores working together to implement any of various machine learning models. In one implementation, the "inference core" is supervised by one or more processing units or engines that are executing higher level software. It is noted that an "inference core" can also be referred to as a "computing core" herein. The higher level software controls the operation of multi-core inference accelerator engine 200. The collection of computing elements of an inference core are arranged in such a way to efficiently process machine learning algorithms. In one implementation, each inference core 201-216 is controlled by a higher level collection of software drivers and embedded software control within a system on chip (SoC).

In one implementation, rather than having each inference core 201-216 fetch input channel data, inference core 201 fetches input channel data and then broadcasts the input channel data to inference cores 202-216. This reduces the memory bandwidth utilization by preventing inference cores 202-216 from fetching the input channel data. This also improves the scalability of inference accelerator engine 200 as the size of the input dataset increases and/or the complexity of the machine learning model increases. While input channel data is broadcast to inference cores 202-216 from inference core 201, each inference core 201-216 fetches its own coefficients for a corresponding set of filters. After receiving the input data and fetching the coefficients, inference cores 201-216 perform the calculations to implement a given layer of a machine learning model (e.g., convolutional neural network).

Figure 3:
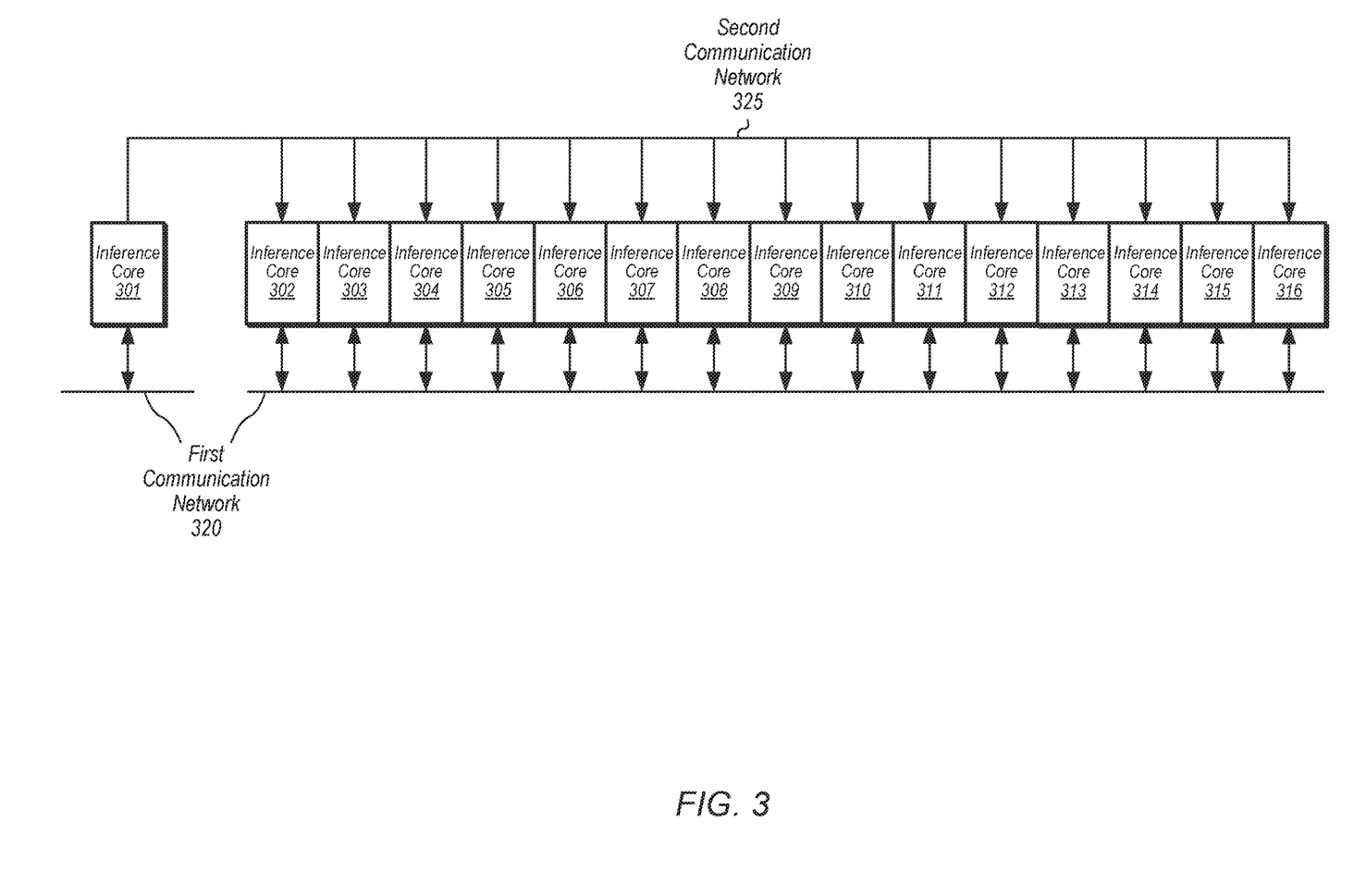
FIG. 3 is a block diagram of one implementation of an arrangement of inference cores.

Referring now to FIG. 3, a block diagram of one implementation of an arrangement of inference cores 301-316 is shown. In the scenario illustrated in FIG. 3, a multi-core inference accelerator engine has 16 inference cores. It should be understood that in other implementations, a multi-core inference accelerator engine can have other numbers of inference cores. Each inference core 301-316 performs calculations for a subset of the total number of filters of a given layer of a machine learning model. For example, if a neural network layer applies 128 filters to the input channel data, then each inference core 301-316 will generate output data for 8 filters applied to the input channel data. Each inference core 301-316 will fetch only those feature coefficients for the filters which the inference core is applying to the input channel data. In one implementation, inference core 301 is fetching both input channel data and coefficients on first communication network 320. After inference core 301 gets the input channel data, inference core 301 broadcasts the input channel data to inference cores 302-316 on second communication network 325. In one implementation, inference core 301 acts as a master inference core for inference cores 301-316. The other inference cores 302-316 act as slaves in this implementation.

Figure 4:
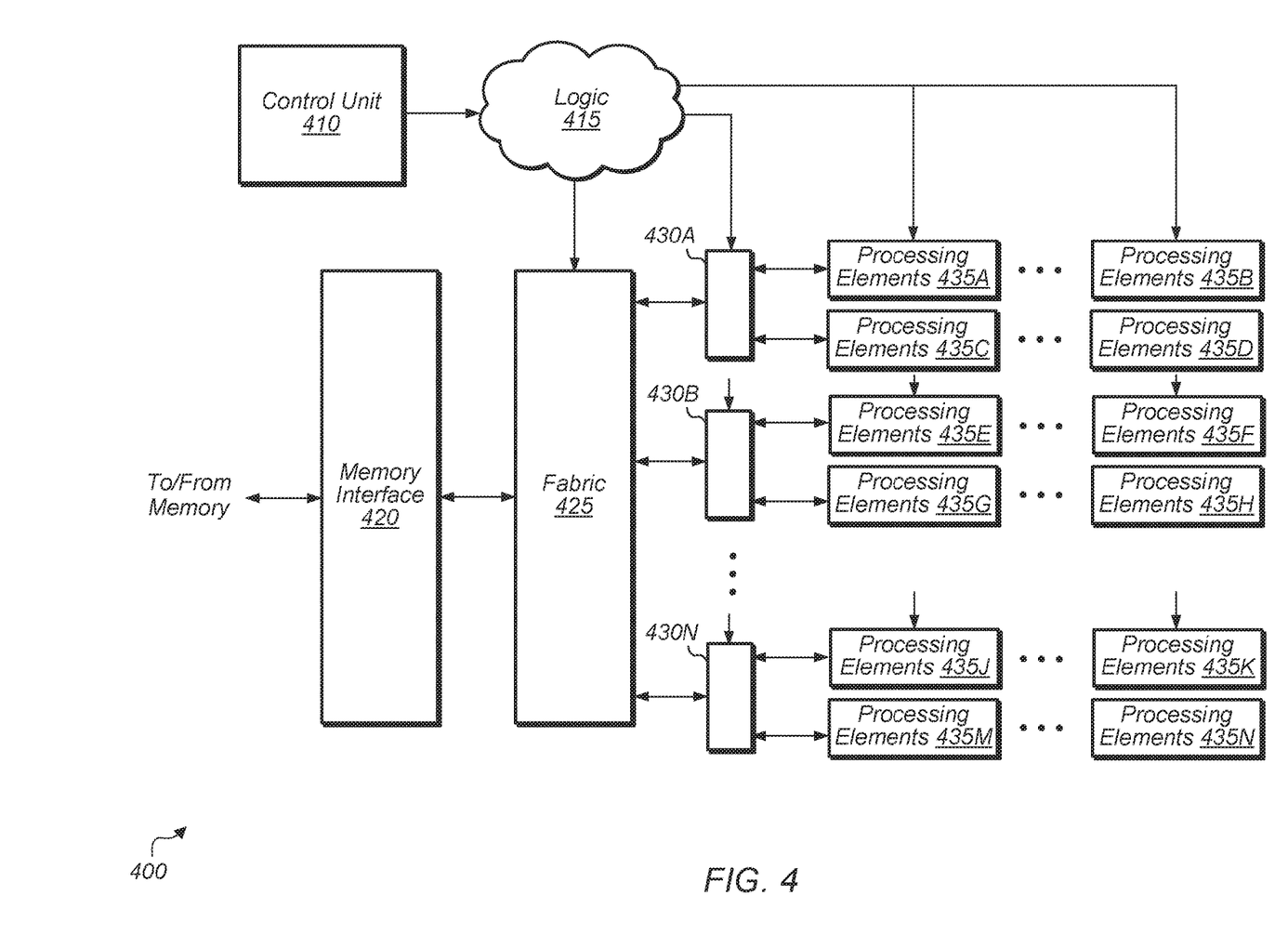
FIG. 4 is a block diagram of one implementation of a multi-core inference accelerator engine.

Turning now to FIG. 4, a block diagram of one implementation of a multi-core inference accelerator engine 400 is shown. In one implementation, the logic of multi-core inference accelerator engine 400 is implemented as inference accelerator engine 105 (of FIG. 1) within system 100. In one implementation, multi-core inference accelerator engine 400 includes control unit 410, logic 415, memory interface 420, fabric 425, communication networks 430A-N, and processing elements 435A-N. In one implementation, each set of processing elements 435A-N is a separate inference core. For example, in this implementation, processing elements 435A correspond to first inference core (e.g., inference core 301 (of FIG. 3)), processing elements 435B correspond to a second inference core (e.g., inference core 302), and so on.

It should be understood that the example of multi-core inference accelerator engine 400 shown in FIG. 4 is merely indicative of one particular implementation. In other implementations, multi-core inference accelerator engine 400 includes other components and/or is arranged in a different manner. In one implementation, control unit 410 determines how to adaptively configure inference accelerator engine 400 to achieve a desired level of memory bandwidth utilization and/or load balancing. Control unit 410 is implemented using any suitable combination of hardware and/or software. Control unit 410 programs logic 415, communication networks 430A-N, and processing elements 435A-N to implement a given machine learning model while achieving the desired level of memory bandwidth utilization and/or load balancing. In one implementation, control unit 410 attempts to balance the load across a plurality of memory channels such that the memory bandwidth on each channel falls within a given range. This prevents one memory channel from handling more than a threshold amount of memory bandwidth.

Multi-core inference accelerator engine 400 includes memory interface 420 coupled to one or more memory devices (not shown). Multi-core inference accelerator engine 400 further includes fabric 425 coupled to memory interface 420, with fabric 425 representative of any type of communication fabric. In one implementation, processing elements 435A-N include a plurality of multiplier-accumulator (MAC) units. In various implementations, processing elements 435A-N also include other hardware units including registers, muxes, demuxes, adders, digital logic gates, and/or other components. Processing elements 435A-N are coupled to fabric 425 via communication networks 430A-N, which are representative of any number, type, and structure of communication networks 430A-N. Fabric 425 is representative of any type of routing logic including within inference accelerator engine 400.

While fabric 425 is shown as a single module in unit 400, it should be understood that fabric 425 can be distributed throughout unit 400 to facilitate the routing of signals and data to various components. Fabric 425 is able to be reconfigured by control signals from logic 415 depending on the operating mode. Depending on the implementation, inference accelerator engine 400 operates in any number of different modes for fetching and broadcasting data among processing elements 435A-M. For example, the input channel data can traverse a first path through a first group of processing elements 435A-N for a first mode, the input channel data can traverse a second path through a second group of processing elements 435A-N for a second mode, and so on.

In one implementation, a first portion of processing elements 435A-N fetch first data from memory and then broadcast the first data to a second portion of processing elements 435A-N. The first portion of processing elements 435A-N fetch first data from memory using one or more first communication networks 430A-N and then broadcast the first data to a second portion of processing elements 435A-N using one or more second communication networks 430A-N. The identification of which processing elements are in the first portion and which processing elements are in the second portion is determined by control unit 410 based on the type of machine learning model being implemented and based on the desired memory bandwidth utilization and/or load balancing. Also, the identification of the first and second communication networks from communication networks 430A-N is determined by control unit 410 based on the type of machine learning model being implemented and based on the desired memory bandwidth utilization and/or load balancing.

Figure 5:
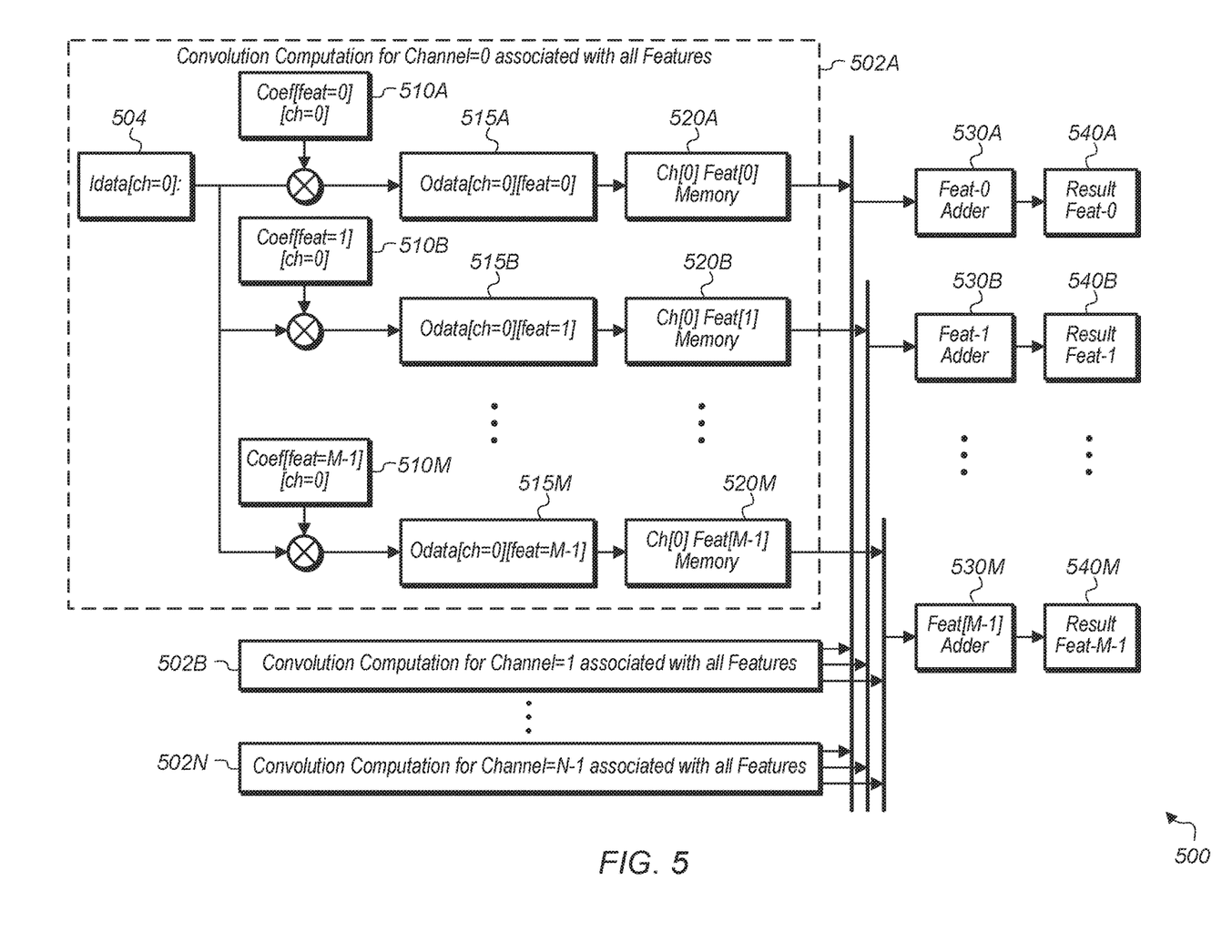
FIG. 5 is a block diagram of one implementation of a convolutional neural network executing on a single inference core.

Referring now to FIG. 5, a block diagram of one implementation of a convolutional neural network executing on a single inference core 500. Depending on the implementation, inference core 500 is implemented as one of the inference cores of a multi-core inference accelerator engine (e.g., multi-core inference accelerator engine 105 of system 100 of FIG. 1). Inference core 500 includes a plurality of channel processing engines 502A-N. The number of channel processing engines 502A-N can vary from implementation to implementation. Channel processing engine 502A is expanded to show the components of a channel processing engine in accordance with one implementation. The other channel processing engines 502B-N include a similar arrangement of components.

The implementation of inference core 500 illustrates a technique for reducing external memory bandwidth utilization. Utilizing the technique illustrated in FIG. 5, the input channel data 504 is read by a single inference core. Next, the single inference core broadcasts the input channel data 504 to all of the inference cores. Each inference core fetches the coefficients 510A-M for the features being processed by the given inference core. The number of "M" features varies according to the layer and according to the implementation.

After the coefficients 510A-M are fetched, convolutions are performed for the input channel data by each inference core for its corresponding features. For example, in one implementation, input channel data 504 is broadcast to all inference cores, and then convolutions are performed by a first inference core for a first subset of features, convolutions are performed by a second inference core for a second subset of features, convolutions are performed by a third inference core for a third subset of features, and so on. The result of the convolution of the input channel data 504 with each feature is shown as the output data blocks 515A-M, and the output data 515A-M is written to memory which is represented by blocks 520A-M. Convolutions are performed for the other channels by the logic in blocks 502B-N in the same manner as convolutions are performed for channel 0 by the logic in block 502A. The number "N" of channels varies according to the layer of the neural network and according to the implementation.

The adders 530A-M illustrate the sums which are calculated for each feature for all of the output channel data generated from the convolutions of all of the N features. The sums generated by adders 530A-M are shown as blocks 540A-M. These sums are then written to external memory after being calculated by adders 530A-M. After the sums are written to the external memory, one or more additional layers of a neural network are implemented.

Figure 6:
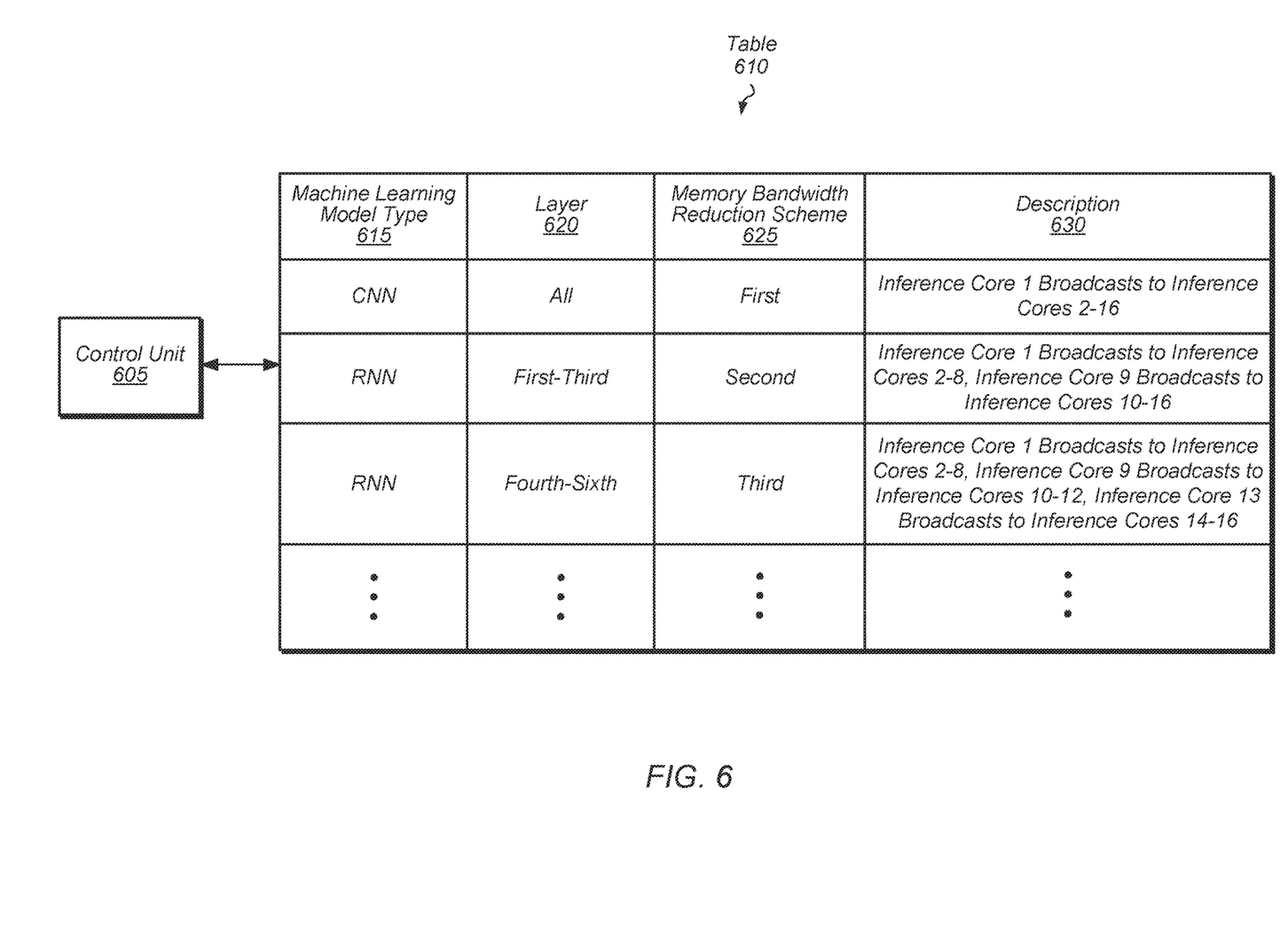
FIG. 6 illustrates one implementation of a table for mapping machine learning model types to memory bandwidth reduction schemes.

Turning now to FIG. 6, one implementation of a table 610 for mapping machine learning model types to memory bandwidth reduction schemes is shown. In one implementation, a control unit 605 includes or is coupled to table 610 for determining which memory bandwidth reduction scheme to use for a given type of machine learning model being implemented on a multi-core inference accelerator engine. Control unit 605 is implemented using any suitable combination of hardware and/or software. In one implementation, control unit 605 is implemented using dedicated logic. In another implementation, control unit 605 is implemented using program instructions which are executable on one or more processors. In other implementations, control unit 605 is implemented using a combination of dedicated logic and program instructions. In one implementation, the entries of table 610 include fields 615, 620, and 625. In other implementations, the entries of table 610 include other numbers and/or types of fields. In various implementations, different types of techniques for determining an optimal or preferred allocation of a machine learning model on a multi-core inference accelerator engine based on constrained memory bandwidth can be accommodated by control unit 605 and table 610. Also, the optimal or preferred allocation can also be based on achieving a desired level of load balancing. Accordingly, the method for obtaining optimal memory bandwidth reduction, load balancing, and/or meeting other performance targets varies according to the implementation.

In one implementation, field 615 is a machine learning model type field which specifies a type of machine learning model that will be implemented on the multi-core inference accelerator engine. For example, the different types of machine learning model types include at least convolutional neural networks (CNNs), recurrent neural networks (RNNs), and others. In one implementation, a software program generates an indication of the type of machine learning model and sends the indication to control unit 605. In this implementation, control unit 605 uses the indication to lookup field 615 of table 610 for a matching entry. In one implementation, control unit 605 also uses the layer that is being implemented to lookup layer field 620. For example, a given machine learning model can use different memory bandwidth reduction schemes for different layers of the model.

When a matching entry is found, control unit 605 retrieves the indication from memory bandwidth reduction scheme field 625 in the matching entry. Then, control unit 605 programs a multi-core inference accelerator engine (e.g., multi-core inference accelerator engine 105 of FIG. 1) to implement this particular type of memory bandwidth reduction scheme. These actions are performed dynamically or statically depending on the implementation. In one implementation, for the first memory bandwidth reduction scheme, inference core 1 broadcasts data to inference cores 2-16. For the second memory bandwidth reduction scheme, inference core 1 broadcasts data to inference cores 2-8 and inference core 9 broadcasts data to inference cores 10-16. For the third memory bandwidth reduction scheme, inference core 1 broadcasts data to inference cores 2-8, inference core 9 broadcasts data to inference cores 10-12, and inference core 13 broadcasts data to inference cores 14-16. It should be understood that these examples of memory bandwidth reduction schemes are illustrative of one particular implementation. Other implementations will use other types of memory bandwidth reduction schemes. It is noted that the description field 630 is shown in FIG. 6 merely to provide a description of the type of memory bandwidth reduction scheme 625 for the purposes of this discussion. Accordingly, the actual implementation of table 610 does not include field 630. Additionally, it should be understood that the example of memory bandwidth reduction scheme field 625 corresponding to 16 inference cores is indicative of one implementation. In other implementations, memory bandwidth reduction scheme field 625 maps to inference accelerator engines with other numbers of inference cores.

Figure 7:
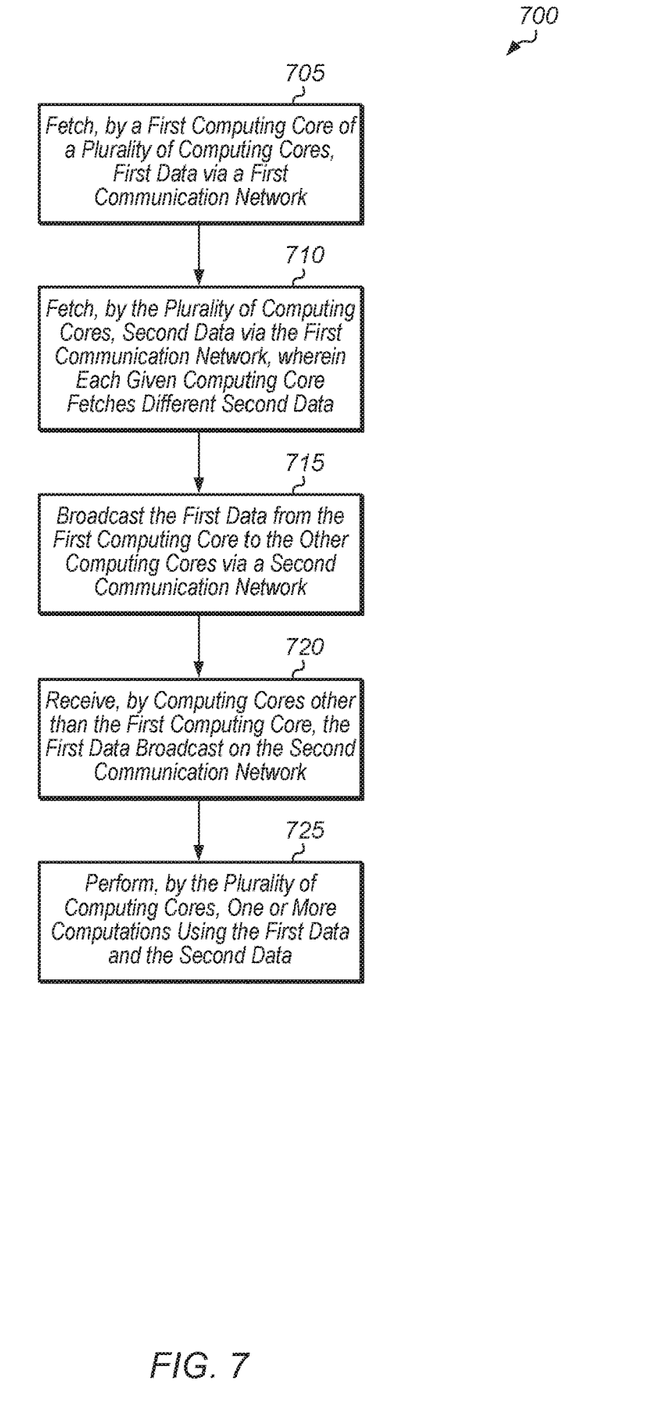
FIG. 7 is a generalized flow diagram illustrating one implementation of a method for reducing memory bandwidth utilization in a multi-core inference accelerator engine.
Figure 8:
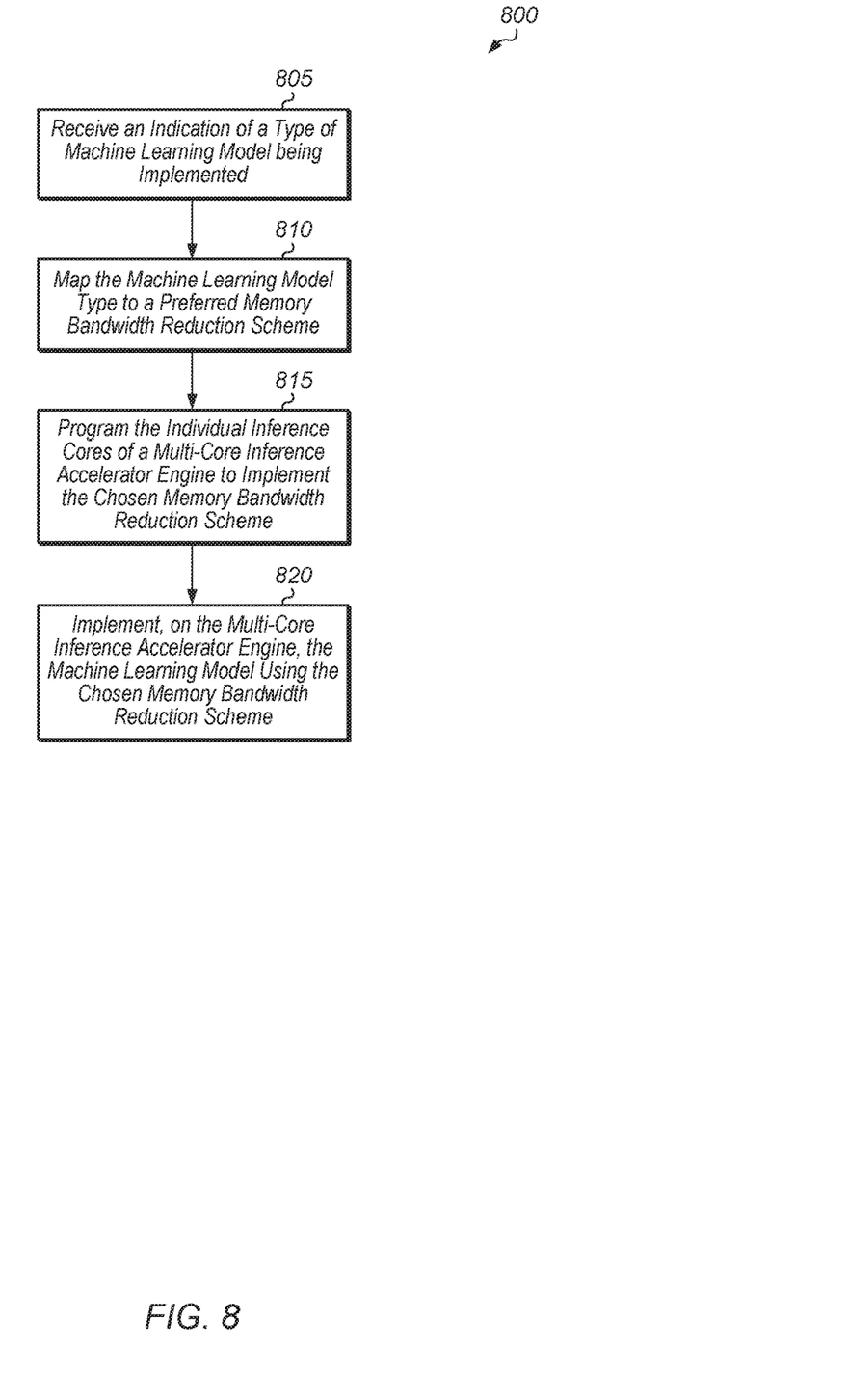
FIG. 8 is a generalized flow diagram illustrating one implementation of a method for adaptively mapping machine learning models to a multi-core inference accelerator engine.
Figure 9:
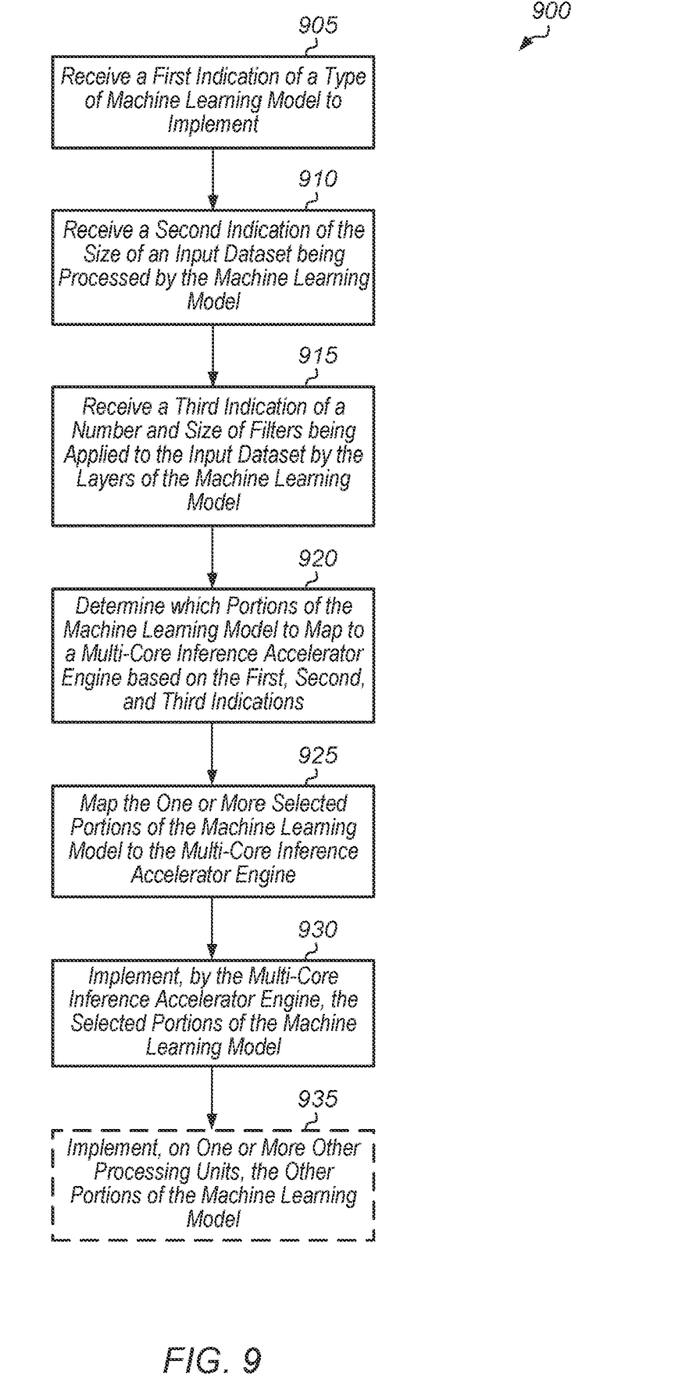
FIG. 9 is a generalized flow diagram illustrating one implementation of a method for adaptively mapping portions of a machine learning model to a multi-core inference accelerator engine.

Referring now to FIG. 7, one implementation of a method 700 for reducing memory bandwidth utilization in a multi-core inference accelerator engine is shown. For purposes of discussion, the steps in this implementation and those of FIG. 8-9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 700.

A first computing core of a plurality of computing cores fetches first data via a first communication network (block 705). In one implementation, the first data is input channel data being processed. Also, the plurality of computing cores fetch second data via the first communication network, wherein each given computing core fetches different second data (block 710). In one implementation, the second data includes sets of feature coefficients for the particular filters of the machine learning model being implemented. The first computing core broadcasts the first data to the other computing cores via a second communication network (block 715).

Next, computing cores other than the first computing core receive the first data broadcast on the second communication network (block 720). Then the plurality of computing cores perform one or more computations using the first data and the second data (block 725). For example, in one implementation, the one or more computations are performed while implementing a machine learning model on a multi-core inference accelerator engine. In other implementations, the one or more computations are performed as part of other types of operations. After block 725, method 700 ends.

Turning now to FIG. 8, one implementation of a method 800 for adaptively mapping machine learning models to a multi-core inference accelerator engine is shown. A control unit (e.g., control unit 605 of FIG. 6) receives an indication of a type of machine learning model being implemented (block 805). Next, the control unit maps the machine learning model type to a preferred memory bandwidth reduction scheme (block 810). In one implementation, the control unit includes or is coupled to a table (e.g., table 610 of FIG. 6) that maps machine learning model types to memory bandwidth reduction schemes. Then, the control unit programs the individual inference cores of a multi-core inference accelerator engine to implement the chosen memory bandwidth reduction scheme (block 815). Next, the multi-core inference accelerator engine implements the machine learning model using the chosen memory bandwidth reduction scheme (block 820). After block 820, method 800 ends.

Referring now to FIG. 9, one implementation of a method 900 for adaptively mapping portions of a machine learning model to a multi-core inference accelerator engine is shown. A control unit (e.g., control unit 605 of FIG. 6) receives a first indication of a type of machine learning model to implement (block 905). Also, the control unit receives a second indication of the size of an input dataset being processed by the machine learning model (block 910). Additionally, the control unit receives a third indication of a number and size of filters being applied to the input dataset by the layers of the machine learning model (block 915).

Next, the control unit determines which portions of the machine learning model to map to a multi-core inference accelerator engine based on the first, second, and third indications (block 920). In one implementation, the control unit maps the entirety of the machine learning model to the multi-core inference accelerator engine. In another implementation, the control unit maps only a portion of the machine learning model to the multi-core inference accelerator engine. After block 920, the control unit maps one or more selected portions of the machine learning model to the multi-core inference accelerator engine (block 925). Next, the multi-core inference accelerator engine implements the selected portions of the machine learning model (block 930). Also, one or more other processing units optionally implement the other portions of the machine learning model (block 935). After block 935, method 900 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a plurality of computing cores; and
a control unit;
wherein responsive to receipt of data indicative of a type of machine learning model, the control unit comprises circuitry configured to:
retrieve an identification of a preferred bandwidth reduction scheme that is mapped to the machine learning model from stored data that maps a plurality of machine learning models to different bandwidth reduction schemes; and
program a first computing core of the plurality of computing cores to implement the preferred bandwidth reduction scheme, wherein the bandwidth reduction scheme causes:
at least one of the plurality of computing cores to fetch and broadcast first data; and
two or more of the plurality of computing cores to receive the first data broadcast by the at least one of the plurality of computing cores;
wherein each of the two or more computing cores of the plurality of computing cores is configured to:
fetch second data for processing with the first data; and
perform one or more computations using the first data and the second data in order to perform a computing operation.

2. The system as recited in claim 1, wherein the second data comprises a set of coefficients associated with a corresponding set of filters.

3. The system as recited in claim 1, wherein the first data comprises input channel data.

4. The system as recited in claim 1, wherein the first computing core is selected based on an identified machine learning model type from a plurality of identified machine learning model types.

5. The system as recited in claim 1, wherein the bandwidth reduction scheme comprises an identification of one or more layers of a machine learning model type.

6. The system as recited in claim 1, wherein the bandwidth reduction scheme comprises an identification of computing cores to which the first computing core broadcasts the first data.

7. The system as recited in claim 5, wherein the control unit is further configured to determine which portions of the machine learning model to map to the plurality of computing cores based on a number and size of filters of the machine learning model.

8. A method comprising:
responsive to receiving data indicative of a type of machine learning model:
retrieving an identification of a preferred bandwidth reduction scheme that is mapped to the machine learning model from stored data that maps a plurality of machine learning models to different bandwidth reduction schemes;
programming a first computing core of a plurality of computing cores to implement the preferred bandwidth reduction scheme, wherein the bandwidth reduction scheme causes:
at least one of the plurality of computing cores to fetch and broadcast first data; and
two or more of the plurality of computing cores to receive the first data broadcast by the at least one of the plurality of computing cores;
each of the two or more computing cores of the plurality of computing cores:
fetching second data for processing with the first data; and
performing one or more computations using the first data and the second data in order to perform a computing operation.

9. The method as recited in claim 8, wherein the second data comprises a set of coefficients associated with a corresponding set of filters.

10. The method as recited in claim 8, wherein the first data comprises input channel data.

11. The method as recited in claim 8, wherein the first computing core is selected based on an identified memory bandwidth reduction scheme.

12. The method as recited in claim 8, wherein the bandwidth reduction scheme comprises an identification of one or more layers of a machine learning model type.

13. The method as recited in claim 12, further comprising determining which portions of the machine learning model to map to the plurality of computing cores based on a size of an input dataset.

14. The method as recited in claim 12, further comprising determining which portions of the machine learning model to map to the plurality of computing cores based on a number and size of filters of the machine learning model.

15. An apparatus comprising:
a plurality of computing cores;
a control unit comprising circuitry; and
a table for mapping memory bandwidth reduction schemes to a processor core designated to broadcast data to one or more other processor cores;
wherein responsive to receipt of data indicative of a type of machine learning model, the control unit is configured to:
  access the table to determine a given memory bandwidth reduction scheme to use in performing an indicated computing operation;
  program a first computing core of the plurality of computing cores to implement the given bandwidth reduction scheme, wherein the bandwidth reduction scheme causes:
    at least one of the plurality of computing cores to fetch and broadcast first data; and
    two or more of the plurality of computing cores to receive the first data broadcast by the at least one of the plurality of computing cores;
  wherein each of the two or more computing cores of the plurality of computing cores is configured to:
    fetch second data for processing with the first data; and
    perform one or more computations using the first data and the second data in order to perform the computing operation.

16. The apparatus as recited in claim 15, wherein the second data comprises a set of coefficients associated with a corresponding set of filters.

17. The apparatus as recited in claim 15, wherein the first data comprises input channel data.

18. The apparatus as recited in claim 15, wherein the one or more computations are performed as part of a machine learning model.

19. The apparatus as recited in claim 18, wherein the indicated computing operation specifies a type of machine learning model to implement.

20. The apparatus as recited in claim 19, wherein the control unit is further configured to determine which portions of the machine learning model to map to the plurality of computing cores based on a size of an input dataset.

\* \* \* \* \*